United States Patent
Kim et al.

(10) Patent No.: US 10,461,874 B2
(45) Date of Patent: Oct. 29, 2019

(54) OPTICAL LINE TERMINAL EFFICIENTLY UTILIZING MULTILANE AND PASSIVE OPTICAL NETWORK COMPRISING THE OPTICAL LINE TERMINAL

(71) Applicant: ELECTRONICS AND TELECOMMUNICATIONS RESEARCH INSTITUTE, Daejeon (KR)

(72) Inventors: Kwang Ok Kim, Jeonju-si (KR); Kyeong Hwan Doo, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/835,717

(22) Filed: Dec. 8, 2017

(65) Prior Publication Data

US 2019/0068307 A1     Feb. 28, 2019

(30) Foreign Application Priority Data

Aug. 23, 2017   (KR) .................... 10-2017-0106664

(51) Int. Cl.
*H04J 3/16*     (2006.01)
*H04J 14/02*    (2006.01)

(52) U.S. Cl.
CPC .......... *H04J 3/1694* (2013.01); *H04J 3/1652* (2013.01); *H04J 14/0245* (2013.01)

(58) Field of Classification Search
CPC .............. H04Q 11/0067; H04J 14/0282; H04J 14/0226; H04J 3/1694; H04J 3/1652; H04J 14/0245; H04N 7/22
See application file for complete search history.

(56) References Cited

U.S. PATENT DOCUMENTS

| | | | |
|---|---|---|---|
| 8,526,818 B2 | 9/2013 | Kim et al. | |
| 2004/0008703 A1* | 1/2004 | Kim .................... | H04L 12/2801 370/401 |
| 2007/0133800 A1* | 6/2007 | Kim .................... | H04L 63/0428 380/256 |
| 2010/0260498 A1* | 10/2010 | Kim ..................... | H04J 3/1694 398/45 |
| 2011/0194854 A1* | 8/2011 | Freire .................. | H04J 3/1694 398/58 |
| 2016/0285556 A1 | 9/2016 | Boyd et al. | |
| 2017/0012731 A1 | 1/2017 | Luo et al. | |
| 2017/0019207 A1 | 1/2017 | Park et al. | |
| 2017/0054649 A1 | 2/2017 | Mamidwar et al. | |
| 2017/0070295 A1 | 3/2017 | Remein et al. | |

* cited by examiner

*Primary Examiner* — Ted M Wang
(74) *Attorney, Agent, or Firm* — LRK Patent Law Firm

(57) ABSTRACT

An optical line terminal (OLT) accumulates and stores a user frame for each physical layer identifier (PLID) to efficiently use a plurality of lanes used for downstream transmission from the OLT to an optical network unit (ONU). The OLT envelopes payloads that are accumulatively stored for the respective PLIDs based on a transmission rate supported by a corresponding ONU, combines an envelope header based on an envelope payload unit, and transmits an envelope frame. The OLT selects an available lane from among a plurality of lanes and may transmit the envelope frame through the selected lane.

8 Claims, 9 Drawing Sheets

OPTICAL LINE TERMINAL EFFICIENTLY UTILIZING MULTILANE AND PASSIVE OPTICAL NETWORK COMPRISING THE OPTICAL LINE TERMINAL

CROSS-REFERENCE TO RELATED APPLICATION

This application claims the priority benefit of Korean Patent Application No. 10-2017-0106664, filed Aug. 23, 2017 in the Korean Intellectual Property Office, the disclosure of which is incorporated herein by reference for all purposes.

BACKGROUND

1. Field of the Invention

One or more example embodiments relate to a passive optical network (PON).

2. Description of Related Art

A passive optical network (PON) is classified into a time division multiple access (TDMA)-PON of dividing and thereby using an optical line for each time and a wavelength division multiplexing (WDM)-PON of dividing and thereby using an optical line for each wavelength according to a transmission scheme.

The TDMA-PON is classified into an Ethernet PON (EPON) and a gigabit-capable PON (GPON) according to a transmission protocol. The TDMA-PON has a point-to-multipoint link structure in which at least one optical network unit (ONU) is connected to a single optical line terminal (OLT). In a downstream from the OLT to the ONU, the OLT may transfer a frame using a broadcast scheme. In an upstream from the ONU to the OLT, the ONU may transfer a frame using a TDM scheme.

The EPON that is standardized by an Institute of Electrical and Electronic Engineers (IEEE) 802.3 standardization group is classified into a 1G-EPON and a 10G-EPON based on a currently supporting transmission rate and provides a frame transmission service through a single wavelength.

SUMMARY

At least one example embodiment provides a passive optical network (PON) that may transmit a frame at a high transmission rate using channel bonding in a plurality of lanes.

According to an aspect of at least one example embodiment, there is provided a method of transmitting, by an optical line terminal (OLT), a user frame, the method including storing the user frame in a first queue corresponding to an optical network unit (ONU) that receives the user frame; storing the user frame stored in the first queue in a second queue corresponding to a transmission rate supported by the ONU; and outputting an envelope payload stored in the second queue to a lane based on whether the lane that connects the OLT and the ONU is in use.

The storing of the user frame in the first queue may include generating a hash value from a destination address included in the user frame; searching a table that stores a physical layer identifier (PLID) of the ONU based on the hash value, and acquiring the PLID of the ONU; and storing the user frame in the first queue corresponding to the acquired PLID.

The table may be generated by adding the PLID of the ONU and a source address at a location of the table corresponding to a hash value that is generated from the source address indicated in a user frame received from the ONU, in response to the user frame being received from the ONU.

The storing of the user frame in the second queue may include storing an envelope payload stored in the first queue in the second queue using a table in which the ONU and the transmission rate supported by the ONU match.

The outputting may include identifying a plurality of lanes corresponding to the transmission rate; and determining a lane to which the envelope payload stored in the second queue is output as a lane that does not transmit any frame among the plurality of lanes.

The outputting may include generating an envelope header corresponding to the envelope payload stored in the second queue based on a lane to which the envelope payload stored in the second queue is output; and combining the envelope payload stored in the second queue with the generated envelope header.

The storing of the user frame in the second queue may include determining whether to store the user frame stored in the first queue in the second queue, based on a timer of the user frame stored in the first queue or an envelope payload size of the first queue.

According to an aspect of at least one example embodiment, there is provided a method of transmitting, by an optical line terminal (OLT), a user frame, the method including classifying the user frame for each transmission rate supported by an optical network unit (ONU) that receives the user frame; identifying at least one lane available to transmit an envelope payload including the user frame based on a transmission rate supported by the ONU; and transmitting the classified envelope payload to the identified lane.

The classifying may include classifying the user frame that is output from the first queue generated for each ONU and to store the user frame for each ONU.

The classifying may include storing the envelope payload in a second queue generated for each transmission rate.

The identifying may include detecting a lane that supports the transmission rate from among a plurality of lanes used by the OLT; and determining a lane that transmits no envelope payload among the detected lanes as a lane used to transmit the envelope payload.

According to an aspect of at least one example embodiment, there is provided an optical line terminal (OLT) including a physical layer identifier (PLID) buffer configured to accumulate and store a user frame to be transmitted to one of a plurality of optical network units (ONUS) connected to the OLT for each PLID of the ONUS; and a frame transmitter configured to transmit an envelope payload generated by accumulating the user frame in the PLID buffer to at least one of a plurality of lanes that connect the OLT and the plurality of ONUs.

The PLID buffer may include a plurality of frame queues generated for the plurality of ONUs, respectively, and configured to receive the user frame in order in which the user frame is received.

The frame transmitter may include a plurality of transmission rate queues generated for transmission rates supported by the plurality of ONUS, respectively, and configured to store the envelope payload accumulated by the PLID buffer.

The frame transmitter may be configured to identify a lane that is used by an ONU corresponding to the envelope payload, and to output envelope payloads stored in the plurality of transmission rate queues to the identified lane based on whether the identified lane is in use.

According to example embodiments, it is possible to transmit a user frame at a high transmission rate using a channel boding in a plurality of lanes.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
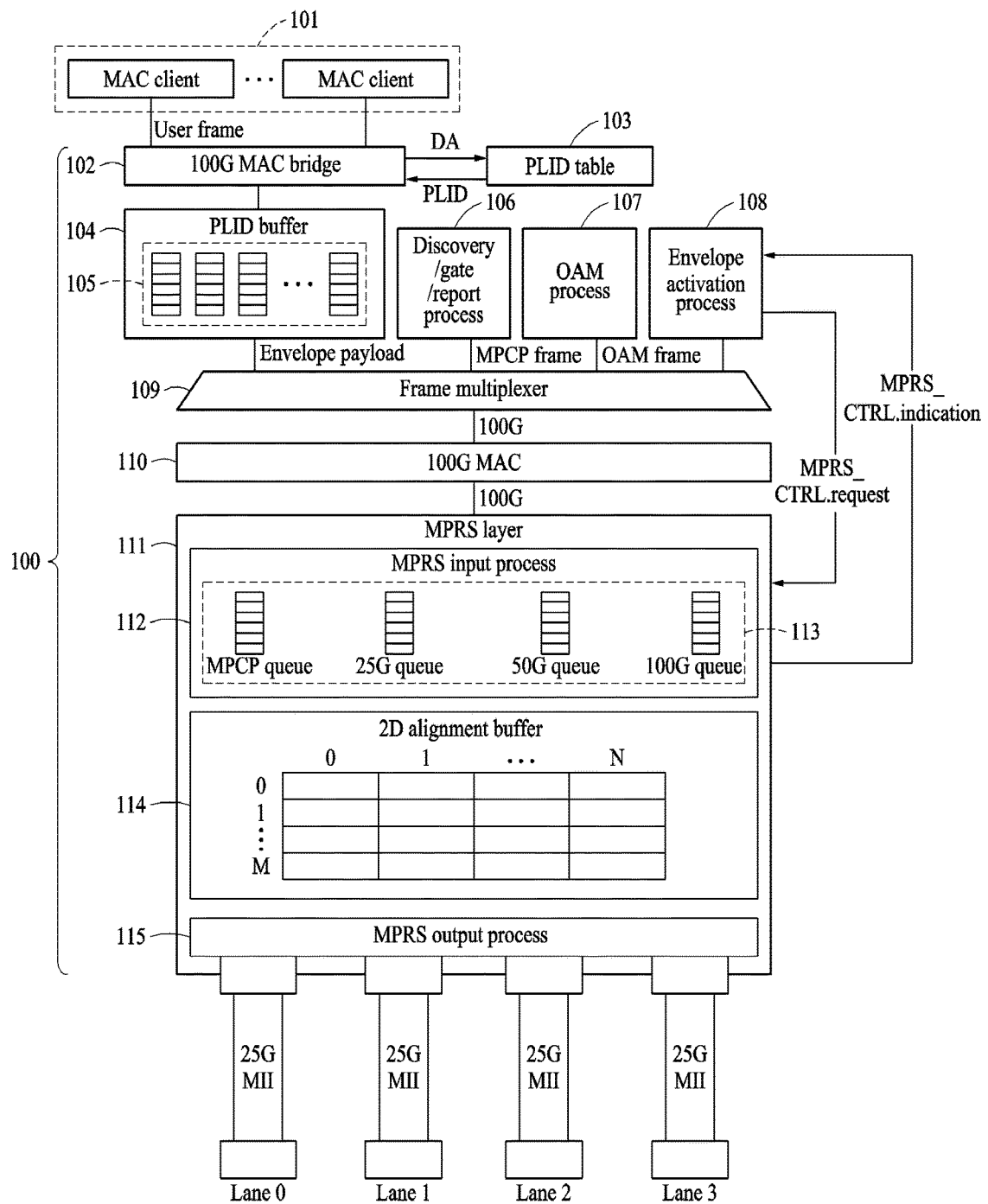
FIG. 1 is a diagram illustrating a structure of an optical line terminal (OLT) for a channel boding in a multilane-based passive optical network (PON) and a concept of processing a user frame according to an example embodiment.

The following structural or functional descriptions of example embodiments described herein are merely intended for the purpose of describing the example embodiments described herein and may be implemented in various forms. However, it should be understood that these example embodiments are not construed as limited to the illustrated forms.

Various modifications may be made to the example embodiments. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. The scope of the claims, however, should not be construed as limited to the example embodiments set forth herein. Like reference numerals in the drawings refer to like elements throughout.

FIG. 1 is a diagram illustrating a structure of an optical line terminal (OLT) for a channel boding in a multilane-based passive optical network (PON) and a concept of processing a user frame according to an example embodiment. FIG. 1 illustrates a structure of processing a downstream transmission frame from an OLT 100 to an optical network unit (ONU) as a portion of the OLT 100. Some components of the OLT 100 are omitted for clarity of description.

The OLT 100 may perform downstream transmission of a user frame using a plurality of wavelengths used by the ONU. The OLT 100 may manage a wavelength used for transmitting the user frame based on a lane unit corresponding to each of a plurality of wavelengths, used to connect the OLT 100 and the ONU. Channel bonding indicates transmitting the user frame at a transmission rate beyond a transmission rate supported in each of the plurality of wavelengths by simultaneously transmitting the user frame using the plurality of wavelengths.

Referring to FIG. 1, the OLT 100 may include a 100 gigabyte (G) media access control (MAC) bridge 102, a physical layer identifier (PLID) table 103, a PLID buffer 104, a discovery/gate/report process 106, an operations, administration, and maintenance (OAM) process 107, an envelope activation process 108, a frame multiplexer 109, and a 100 G MAC 110. As components of a multipoint reconciliation sublayer (MPRS) 111, the OLT 100 may include an MPRS input process 112 including a multipoint control protocol (MPCP) queue and a plurality of queues, for example, a 25 G queue, a 50 G queue, and a 100 G queue, for the respective transmission rates, a two-dimensional (2D) alignment buffer 114, and an MPRS output process 115. The MPRS 111 may perform channel bonding based on an envelope quanta (EQ) unit with a length of 8 bytes, and may add an 8-byte envelope header (EH) to each envelope payload output from the PLID buffer 104. The MPRS 111 may request a 64-bit (8-byte) data transmission per 1562.5 megahertz (MHz) clock to transmit a user frame of 100 Gb/s through channel bonding. The OLT 100 may use a 195.3125 MHz clock and a 512-bit data bus.

Referring to FIG. 1, the 100 G MAC bridge 102 may receive a user frame having a low transmission rate, for example, 100 Gb/s or less, from at least one MAC client 101. The 100 G MAC bridge 102 may multiplex the received user frame to a high transmission rate, for example, a transmission rate of 100 Gb/s and may output the multiplexed user frame. A frame received by the 100 G MAC bridge 102 may include a destination address (DA) indicating a destination to which the user frame is to be transmitted. A destination address field may have a length of 48 bits.

The 100 G MAC bridge 102 may identify a PLID corresponding to the destination address of the user frame by searching the PLID table 103 that stores PLIDs of ONUs. The PLID may include 16 bits. The 100 G MAC bridge 102 may combine and thereby output the identified PLID and the multiplexed user frame. An operation of the 100 G MAC bridge 102 searching the PLID table 103 is further described below.

Each of the at least one MAC client 101 that transmits a frame to the 100 G MAC bridge 102 may transmit a user frame at a different transmission rate. For example, different transmission rates used by the MAC clients 101 may be 1 Gb/s, 10 Gb/s, 25 Gb/s, 50 Gbps, and 100 Gb/s. If a user frame having the same transmission rate as that of a user frame output from the 100 G MAC bridge 102 is input from the MAC client 101, for example, with respect to a user frame of the MAC client 101 that supports a 100 Gb/s interface, the 100 G MAC bridge 102 may combine only the PLID and the user frame and thereby perform output without changing the transmission rate.

Referring to FIG. 1, the PLID buffer 104 may include a plurality of queues 105 configured for the respective ONUs. That is, a number of the plurality of queues 105 may be determined based on a number of ONUS connected to the OLT 100. Each of the plurality of queues 105 may be identified based on an identifier, for example, a PLID of a corresponding ONU, and may store a user frame to be transmitted to the corresponding ONU. Each of the plurality of queues 105 may accumulate and store a user frame based on a first in first out (FIFO) scheme.

If an entire length of user frames accumulated in each of the plurality of queues 105 is greater than a preset envelope size, the accumulated user frames may be output as an envelope payload from the PLID buffer 104. The envelope payload indicates a frame output from the PLID buffer 104 and a frame in which user frames are accumulated or combined for the respective PLIDs. If the envelope size is set as 512 bytes, each of the plurality of queues 105 of the PLID buffer 104 may output a stored user frame when a queue size reaches 512 bytes or more. If user frames each having a length of 64 bytes are input, 8 user frames (8×64=512) are combined in each of the plurality of queues 105 and output as the envelope payload with a length of 512 bytes.

Although the queue size does not exceed the preset envelope size, a predetermined standby time may be required. In this case, the accumulated user frames may be output from the PLID buffer 104. A timer indicating that a user frame is to be transmitted to a destination within a preset time may be determined based on the destination included in the user frame.

As described above, a single user frame or a plurality of user frames output from the PLID buffer 104 is referred to as the envelope payload. That is, a single envelope payload may include at least one user frame that is simultaneously output in response to an entire length of user frames stored in a queue exceeding the envelope size. Alternatively, a single envelope payload may include a single user frame that is output in response to completion of the timer. A transmission rate of the envelope payload may be equal to an output transmission rate, for example, 100 Gb/s, of the 100 G MAC bridge 102.

The discovery/gate/report process 106 may output an MPCP frame that is used to discover and control an ONU. The MPCP frame may request that the MPCP frame is to be transmitted at a preset time, for example, at preset intervals. The OAM process 107 may output an OAM frame that is used to operate and control the ONU and the OLT 100.

Referring to FIG. 1, the frame multiplexer 109 may multiplex and thereby output the envelope payload, the MPCP frame, and the OAM frame that are input at a transmission rate of 100 Gb/s. If the envelope payload, the MPCP frame, and the OAM frame are simultaneously input, the frame multiplexer 109 may perform the output in order of the MPCP frame, the OAM frame, and the envelope payload based on a priority scheduler. The 100 G MAC 110 may perform Ethernet-related frame processing on the 100 Gb/s input frame.

Referring to FIG. 1, the MPRS 111 may include the MPRS input process 112, the 2D alignment buffer 114, and the MPRS output process 115.

The MPRS input process 112 may distribute the envelope payload that is input at the transmission rate of 100 Gb/s to the 2D alignment buffer 114 based on a 8-byte unit, in response to an MPRS_CTRL[4].request signal that is an envelope activation process control signal. The MPRS input process 112 may control a transmission flow of the envelope payload based on a parity bit that is inserted from a forward error correction (FEC). While the MPRS input process 112 is distributing a frame to the 2D alignment buffer 114, the 2D alignment buffer 114 may combine an 8-byte envelope header including a logical link identifier (LLID), an envelope position alignment marker (EPAM), and an envelope length value with a start location of the frame. The 8-byte envelope header may be added for each LLID. The LLID included in the envelope header may include a PLID or a ULID value. The MPRS input process 112 may request a transmission of a subsequent envelope using an MPRS_CTRL[4].indication signal. As described above, the envelope header may include an LLID, an EAPM, and an envelope length value.

The MPRS input process 112 may include the queues 113 that are provided for the respective transmission rates. To classify and store envelope payloads transmitted from the 100 G MAC 110, the MPRS input process 112 may search for an attribute of an ONU that receives an envelope frame in which an envelope payload and an envelope header are combined. The envelope frame is a frame in which the envelope payload and the 8-byte envelope header are combined by the MPRS input process 112. The retrieved attribute of the ONU may include information associated with a type of the ONU. The type of the ONU may be 25 G, 50 G, and 100 G. In this case, the MPRS input process 112 may generate a 25 G queue, a 50 G queue, and a 100 G queue corresponding to transmission rates of 25 G, 50 G, and 100 G, respectively. The MPRS input process 112 may include an MPCP queue configured to accumulate and store an MPCP frame among envelope payloads transmitted from the 100 G MAC 110. If a 16-bit LLID value input with a frame of 100 Gb/s is an PLID value, the MPRS input process 112 may input the frame of 100 Gb/s to the MPCP queue. If the input value is a ULID value, the MPRS input process 112 may input the frame of 100 Gb/s to one of the queues 113 that are provided for the respective transmission rates, based on the ONU attribute. The MPCP frame and the OAM frame may be stored in the MPCP queue and may be transmitted to the ONU through the MPCP queue. The MPCP frame and the OAM frame may be transmitted with the PLID of the ONU that receives a corresponding frame. The envelope payload may be transmitted to the ONU through the 25 G queue, the 50 G queue, or the 100 G queue. The envelope payload may be transmitted together with the ULID of the ONU that receives the corresponding frame.

Once the envelope payload is stored in one of the queues 113, the MPRS input process 112 may transfer an envelope request message MPRS_CTRL.indication indicating a frame standby to the envelope activation process 108 to transmit the stored envelope payload. In response to the envelope request message MPRS_CTRL.indication, the envelope activation process 108 may output, to the MPRS input process 112, an envelope allocation message MPRS_CTRL.request that is generated based on service states of lanes used for downstream transmission.

Once the envelope allocation message MPRS_CTRL.request is received from the envelope activation process 108, the MPRS input process 112 may output, to the 2D alignment buffer 114, a frame that is stored in the MPCP queue, the 25 G queue, the 50 G queue, or the 100 G queue based on the envelope allocation message. The envelope allocation message MPRS_CTRL.request may include information regarding a lane to which the envelope frame is to be transmitted. The MPRS input process 112 may assign a relatively high priority to a frame of the MPCP queue. That is, the MPRS input process 112 may preferentially transmit an envelope frame stored in the MPCP queue to the 2D alignment buffer 114 rather than transmitting an envelope frame stored in a queue for each transmission rate.

Referring to FIG. 1, the 2D alignment buffer 114 may include a cell with a size of N×M. In a multilane-based PON that supports a transmission rate of 100 Gb/s, N may be 3. M may be set based on propagation delay variability between the OLT 100 and the ONU. In the case of transmitting an envelope frame having a transmission rate of 100 Gb/s, the envelope frame may be divided and thereby stored in one or more cells of the 2D alignment buffer 114. The envelope frame may be sequentially stored along a corresponding column of the 2D alignment buffer 114 in an empty row of the 2D alignment buffer 114. For example, referring to FIG. 1, in a zero-th row, the envelope frame may be sequentially stored up to an N-th cell starting from a zero-th cell. Although the envelope frame is stored in all of the cells that constitute a single row of the 2D alignment buffer 114, the envelope frame to be stored in the 2D alignment buffer may remain. In this case, in a subsequent row, a portion of the remaining envelope frame may be sequentially stored along a column of the 2D alignment buffer 114. Referring to FIG. 1, if all of the cells that constitute the zero-th row are in use, the envelope frame may be divided and stored up to an N-th cell of a first row starting from a zero-th cell of a zero-th row and a zero-th column.

The MPRS output process 115 may transfer an envelope frame stored in the 2D alignment buffer 114 to a corresponding lane based on a 25GMII interface standard.

Hereinafter, an operation in which the 100 G MAC bridge 102 of FIG. 1 searches the PLID table 103 is further described with reference to FIG. 2.

Figure 2:
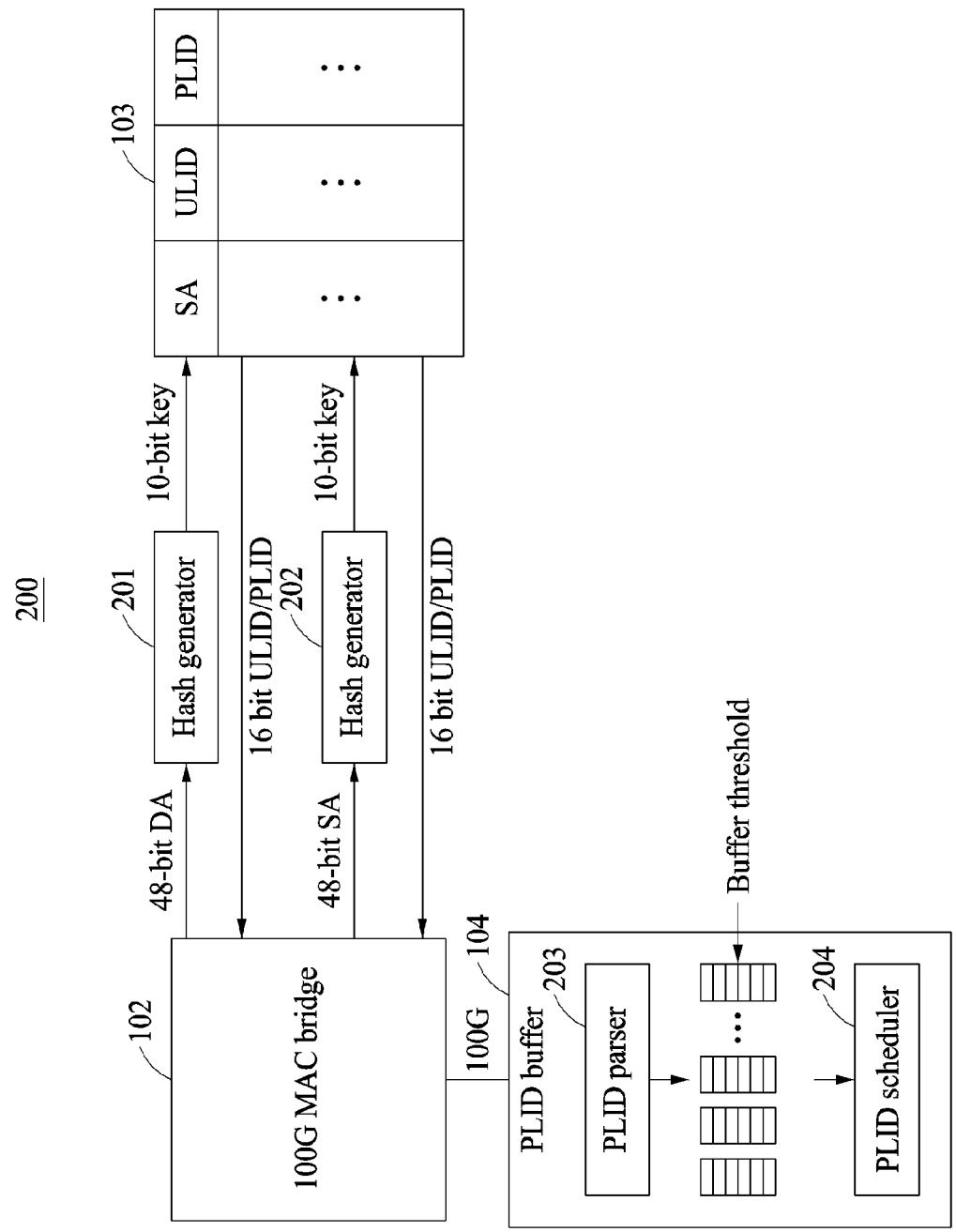
FIG. 2 is a diagram illustrating a structure of a frame parser included in an OLT and configured to classify a user frame for each physical layer identifier (PLID) corresponding to a destination of the user frame according to an example embodiment.

FIG. 2 is a diagram illustrating a structure of a frame parser 200 included in an OLT and configured to classify a user frame for each PLID corresponding to a destination of the user frame according to an example embodiment.

Referring to FIG. 2, the frame parser 200 may include the 100 G MAC bridge 102, the PLID table 103, the PLID buffer 104, and hash generators 201 and 202. The 100 G MAC bridge 102 may input, to the hash generator 201, a destination address (DA) value having a length of 48 bits (48-bit DA) in a user frame that is transmitted through downstream transmission. The hash generator 201 may generate a 10-bit hash value from the input destination address DA value. The hash value may be used as an address value of the PLID table 103. If a source address (SA) value stored in an address field of the PLID table 103 corresponding to the hash value and the destination address DA value math, a 16-bit ULID value and PLID value stored in the address corresponding to the hash value may be transmitted from the PLID table 103 to the 100 G MAC bridge 102.

The 100 G MAC bridge 102 may input, to the hash generator 202, a source address SA value having a length of 48 bits (48-bit SA). The hash generator 202 may generate a 10-bit hash value from the input source address SA value. The 100 G MAC bridge 102 may use the generated hash value as an address value of the PLID table 103. The 100 G MAC bridge 102 may store a 16-bit ULID value and PLID value in an address field of the PLID table 103 corresponding to the hash value. The PLID table 103 may store a plurality of ULID values with respect to the same PLID. The 100 G MAC bridge 102 may use a 512-bit data bus per clock to transmit a frame at 100 Gb/s.

Referring to FIG. 2, the PLID buffer 104 may include a PLID parser, at least one queue generated for each PLID, and a PLID scheduler 204. The PLID parser 203 may retrieve a PLID value using a ULID value input with a user frame of 100 Gb/s, and may store the user frame in a queue corresponding to the PLID value among one or more queues generated for each PLID. If a queue size exceeds an envelope size set by an operator, at least one user frame stored in a queue may be output. The envelope size may be set based on a byte unit. User frames of which entire length is less than the envelope size may be accumulated in the PLID buffer 104 by the envelope size and thereby output. Accordingly, an envelope payload transmission of combining and thereby transmitting the user frames having the length less than the envelope size may be supported. Further, since a single envelope header is combined with a plurality of user frames instead of combining an envelope header for each of the user frames having the length less than the envelope size, a band waste by combining the envelope header for each user frame may be reduced. A user frame having a length greater than or equal to the envelope size may be transmitted alone.

Referring to FIG. 2, the PLID buffer 104 may classify and thereby transmit a user frame for each ONU. Accordingly, a single envelope header may be combined with a plurality of user frames having the same PLID. The PLID scheduler 204 may allocate a grant to each queue in a round robin form in response to a ready signal provided from each queue. If a plurality of user frames is input to a specific queue, the PLID scheduler 204 may allocate a grant only to the specific queue through round robin scheduling.

Figure 3:
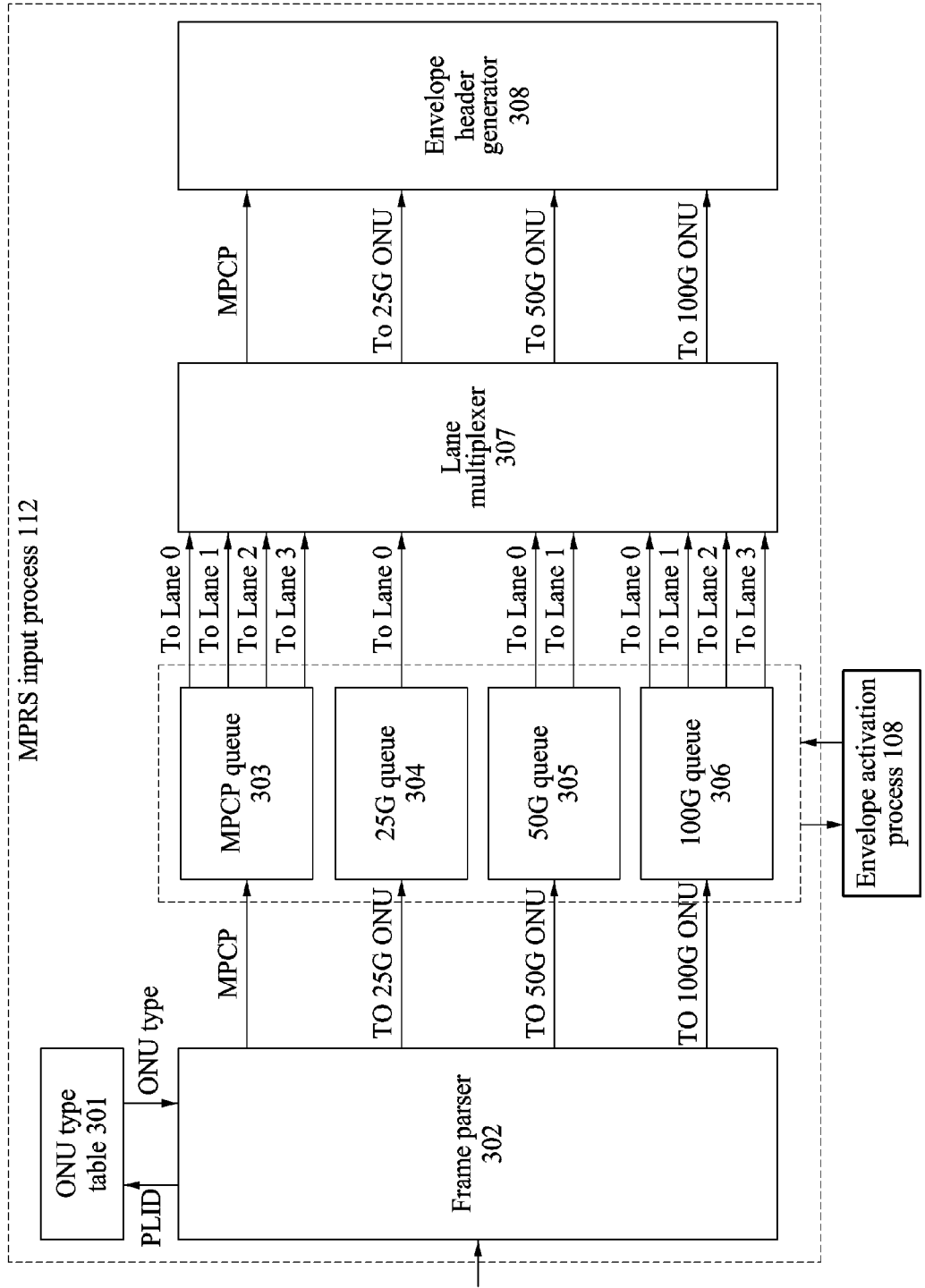
FIG. 3 is a diagram illustrating a structure of a multipoint reconciliation sublayer (MPRS) input process of FIG. 1.

FIG. 3 is a diagram illustrating a structure of the MPRS input process 112 of FIG. 1. Referring to FIG. 3, the MPRS input process 112 may include an ONU type table 301, a frame parser 302, an MPCP queue 303, a 25 G queue 304, a 50 G queue 305, a 100 G queue 306, a lane multiplexer 307, and an envelope header generator 308.

The frame parser 302 may receive an envelope payload in which a single user frame of 100 Gb/s or short user frames are multiplexed. The frame parser 302 may detect a type of an ONU that receives the envelope payload based on a PLID that is received with the envelope payload. The frame parser 302 may detect the type of the ONU by accessing the ONU type table 301 based on the PLID.

The type of the ONU may include information associated with a transmission rate of the ONU. For example, the type of the ONU indicates a transmission rate that is supported by the ONU among 25 Gb/s, 50 Gb/s, and 100 Gb/s. The frame parser 302 may transfer the envelope payload to a queue corresponding to a transmission rate of the ONU based on an ONU type detected for each envelope payload. For example, if an ONU that receives an envelope payload supports the transmission rate of 50 Gb/s, the frame parser 302 may store the envelope payload in the 50 G queue 305.

Referring to FIG. 3, once an envelope payload is input to a queue of the MPRS input process 112, the MPRS input process 112 may notify the envelope activation process 108 to be ready to transmit the envelope frame. If lane information used to transmit the envelope frame is received from the envelope activation process 108, the envelope frame in which an envelope header and an envelope payload stored in a queue are combined may be transmitted through a lane corresponding to lane information used to receive.

In the case of transmitting and receiving an envelope frame using four lanes, for example, lane 0 to lane 3, between an OLT and an ONU, an envelope frame generated from an envelope payload stored in the MPCP queue 303 may be transmitted to the ONU through at least one lane from among lane 0 to lane 3 based on a type of the ONU. An envelope frame generated from an envelope payload stored in the 25 G queue 304 may be transmitted to the ONU through lane 0. An envelope frame generated from an envelope payload stored in the 50 G queue 305 may be transmitted to the ONU through lane 0 or lane 1. If lane 0 is in use between lane 0 and lane 1 capable of transmitting the envelope frame generated from the envelope payload stored the 50 G queue 305, the generated envelope frame may be transmitted through lane 1. An envelope frame generated from an envelope payload stored the 100 G queue 306 may be transmitted to the ONU through at least one of lane 1 through lane 3. If lane 0 is in use, the envelope frame generated from the envelope payload of the 100 G queue 306 may be transmitted to the ONU through lane 1 to lane 3. If lane 0 and lane 1 are in use, the envelope frame generated from the envelope payload of the 100 G queue 306 may be transmitted to the ONU through lane 2 and lane 3. Each of the MPCP queue 303, the 25 G queue 304, the 50 G queue 305, and the 100 G queue 306 may store envelope payload length information with the corresponding envelope payload.

Each of the MPCP queue 303, the 25 G queue 304, the 50 G queue 305, and the 100 G queue 306 may adjust an envelope payload output rate based on a size of a data bus to which a frame is input and a size of a data bus for each lane through which the envelope payload is output. In the case of using a 512-bit data bus for 100 Gb/s transmission and using a 128-data bus for each lane, the 25 G queue 304 may output a 512-bit envelope payload to lane 0 based on a 4-clock cycle unit. In the case of performing simultaneous transmission using lane 0 and lane 1, the 50 G queue 305 may output a 512-bit envelope payload to lane 0 and lane 1 based on a 2-clock cycle unit. If only lane 1 is available, the 50 G queue 305 may output a 512-bit envelope payload to lane 1 based on a 4-clock cycle unit. In the case of performing simultaneous transmission using lane 0 through lane 3, the 100 G queue 306 may output a 512-bit envelope payload to lane 0 through lane 3 based on a 1-clock cycle unit. The data bus for each lane may use 64 bits or 128 bits based on a clock rate.

Referring to FIG. 3, the lane multiplexer 307 may multiplex an envelope frame output from each of the MPCP queue 303, the 25 G queue 304, the 50 G queue 305, and the 100 G queue 306, and may transfer the multiplexed envelope frame to a corresponding lane. The lane multiplexer 307 may not multiplex envelope frames stored in different queues in association with the same lane. For example, if the 25 G queue 304 outputs an envelope payload to lane 0, the lane multiplexer 307 may not multiplex an envelope payload output from the 50 G queue 305 or the 100 G queue 306 in association with lane 0. The lane multiplexer 307 may transfer the envelope payload to each lane at a transmission rate of 25 Gb/s. Accordingly, an envelope payload input from the MPRS input process 112 at a transmission rate of 100 Gb/s may be output from the respective four lanes at a transmission rate of 25 Gb/s.

Referring to FIG. 3, the envelope header generator 308 adds an 8-byte envelope header to a start of an envelope payload that is transferred to each lane. A PLID value or a ULID value may be input to an LLID field of the envelope header and an input location value of a 2D buffer may be input to an EPAM. An envelope length, that is, an envelope size may be determined based on a length value of an envelope payload that is standing by in each queue. The envelope length may be calculated based on an 8-byte unit. If a 512-byte frame is transmitted to the 500 queue 305 through lane 0 and lane 1, each envelope length value may be determined as 32 (frame length/(8×a number of lanes)).

Figure 4:
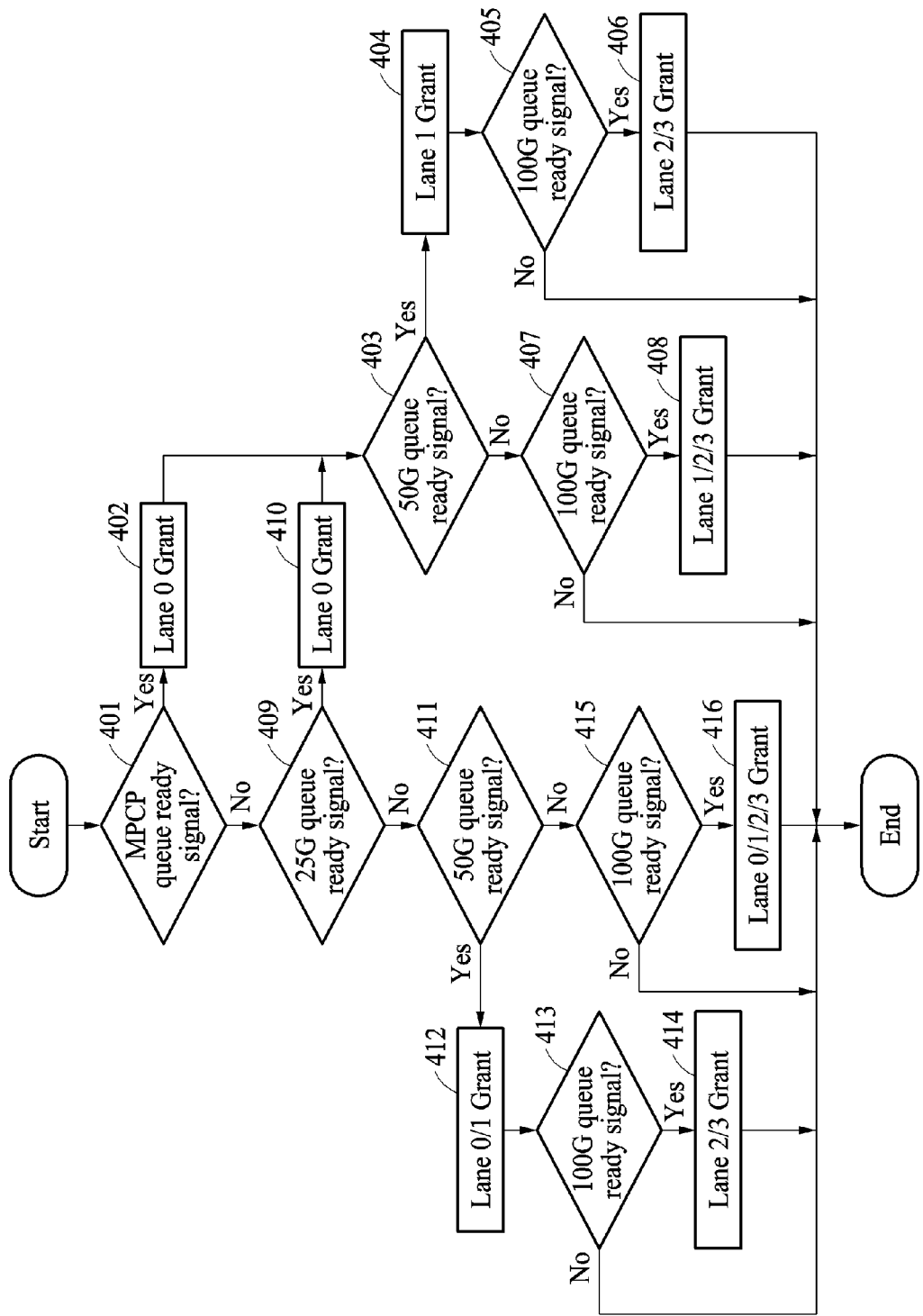
FIG. 4 is a flowchart illustrating an operation performed by an envelope activation process according to an example embodiment.

FIG. 4 is a flowchart illustrating an operation performed by an envelope activation process according to an example embodiment. The envelope activation process of FIG. 4 may correspond to the envelope activation process 108 of FIG. 3. If an MPRS input process transmits an envelope request signal (MPRS_CTRL.indication) to the envelope activation process, the envelope activation process may perform the operation of FIG. 4. The envelope request signal may include at least one of an MPCP queue ready signal indicating that an envelope payload is stored in an MPCP queue, a 25 G queue ready signal indicating that an envelope payload is stored in a 25 G queue, a 500 queue ready signal indicating that an envelope payload is stored in a 50 G queue, and a 100 G queue ready signal indicating that an envelope payload is stored in a 100 G queue. Each of the MPCP queue ready signal, the 25 G queue ready signal, the 500 queue ready signal, and the 100 G queue ready signal may indicate that an envelope payload stored in a corresponding queue is in a transmission standby state.

Referring to FIG. 4, in operation 401, the envelope activation process may determine whether an MPCP queue ready signal is included in the envelope request signal. When the envelope request signal is determined to include the MPCP queue ready signal, the envelope activation process may transmit an envelope allocation signal (MPRS_CTRL.request) including a grant of lane 0 to the MPCP queue so that a frame stored in the MPCP queue may be transmitted to an ONU through lane 0 in operation 402.

When the envelope request signal is determined to include the MPCP queue ready signal and the 50 G queue ready signal in operation 403, the envelope activation process may transmit an envelope allocation signal including a grant of lane 1 to the 50 G queue so that the envelope payload stored in the 50 G queue may be transmitted to the ONU through lane 1 in operation 404. In this case, since the envelope payload stored in the MPCP queue is transmitted to the ONU through lane 0, the envelope payload stored in the 50 G queue may be transmitted to the ONU through only lane 1. The envelope payload stored in the MPCP queue and the envelope payload stored in the 50 G queue may be simultaneously transmitted to the same ONU or different ONUs.

When the envelope request signal is determined to include all of the MPCP queue ready signal, the 50 G queue ready signal, the 100 G queue ready signal in operation 405, the envelope activation process may transmit an envelope allocation signal including a grant of lane 2 and 3 to the 100 G queue so that the envelope payload stored in the 100 G queue may be transmitted to the ONU through lane 2 and lane 3 in operation 406. The envelope payload stored in the MPCP queue is transmitted to the ONU through lane 0 and the envelope payload stored in the 50 G queue is transmitted to the ONU through only lane 1. Thus, the envelope payload stored in the 100 G queue may be transmitted to the ONU through lane 2 and lane 3. The envelope payload stored in the MPCP queue, the envelope payload stored in the 50 G queue, and the envelope payload stored in the 100 G queue may be simultaneously transmitted to different ONUs.

When the envelope request signal is determined to include the MPCP queue ready signal and the 100 G queue ready signal in operation 407, the envelope activation process may transmit an envelope allocation signal including a grant of lane 1 through lane 3 to the 100 G queue so that the envelope payload stored in the 100 G queue may be transmitted to the ONU through lane 1 through lane 3 in operation 408. Since the envelope payload stored in the MPCP queue is transmitted to the ONU through lane 0, the envelope payload stored in the 100 G queue may be transmitted to the ONU through lane 1 through lane 3. The envelope payload stored in the MPCP queue and the envelope payload stored in the 100 G queue may be simultaneously transmitted to the same ONU or to different ONUs.

When the envelope request signal is determined to not include the MPCP queue ready signal and to include the 25 G queue ready signal in operation 409, the envelope activation process may generate an envelope allocation signal so that the envelope payload stored in the 25 G queue may be transmitted to the ONU through lane 0. Since the envelope payload stored in the 25 G queue uses only lane 0, the envelope activation process may determine whether the envelope request signal includes the 50 G queue ready signal or the 100 G queue ready signal using lane 1 through lane 3 so that lane 1 through lane 3 may be used in operations 403, 405, and 407.

Accordingly, when the envelope request signal is determined to simultaneously include the 25 G queue ready signal, the 50 G queue ready signal, and the 100 G queue ready signal, the envelope activation process may generate an envelope allocation signal so that the envelope payload stored in the 25 G queue may be transmitted through lane 0, the envelope payload stored in the 50 G queue may be transmitted through lane 1, and the envelope payload stored in the 100 G queue may be transmitted through lane 2 and lane 3 in operations 404 and 406. Additionally, when the envelope request signal is determined to not include the 50 G queue ready signal and to include the 25 G queue ready signal and the 100 G queue ready signal, the envelope activation process may generate an envelope allocation signal so that a frame stored in the 25 G queue may be transmitted through lane 0 and the envelope payload stored in the 100 G queue may be transmitted through lane 1 through lane 3 in operation 408.

When the envelope request signal is determined to not include the MPCP queue ready signal and the 25 G queue ready signal and to include the 50 G queue ready signal in operation 411, the envelope activation process may transmit an envelope allocation signal including a grant of lane 0 and lane 1 to the 50 G queue so that the envelope payload stored in the 50 G queue may be transmitted through lane 0 and lane 1 in operation 412. When the envelope request signal is determined to include the 50 G queue ready signal and the 100 G queue ready signal in operation 413, the envelope activation process may transmit an envelope allocation signal including a grant of lane 2 and lane 3 to the 100 G queue so that the envelope payload standing by in the 50 G queue may be transmitted through lane 0 and lane 1 and the envelope payload standing by in the 100 G queue may be transmitted through lane 2 and lane 3 in operation 414.

When the envelope request signal is determined to not include the MPCP queue ready signal, the 25 G queue ready signal, and the 50 G queue ready signal and to include the 100 G queue ready signal in operation 415, the envelope activation process may generate an envelope allocation signal including a grant of lane 0 through 3 and may transmit the generated envelope allocation signal to the 100 G queue so that the envelope payload standing by in the 100 G queue may be transmitted to the ONU through lane 0 through lane 3.

Figure 5:
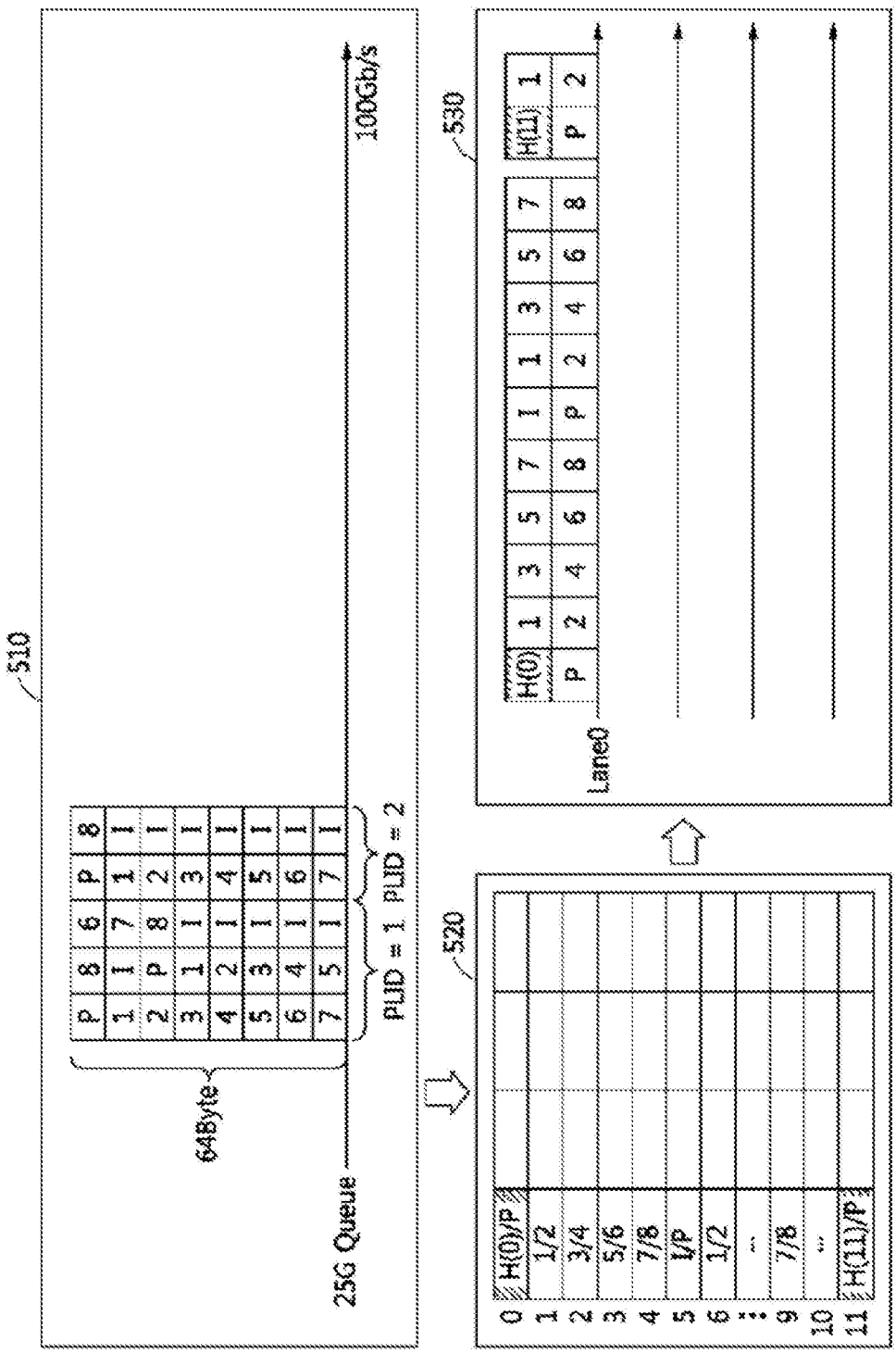
FIG. 5 illustrates an example in which an OLT transmits a user frame having a transmission rate of 25 gigabytes/second (Gb/s) using channel bonding according to an example embodiment.

FIG. 5 illustrates an example in which an OLT transmits a user frame having a transmission rate of 25 Gb/s using channel bonding according to an example embodiment. Herein, it is assumed that the OLT transmits two user frames to an ONU having PLID=1 and transmits a single user frame to an ONU having PLID=2. Each user frame may include a preamble indicated with 'P'.

A 25 G queue of an MPRS input process of the OLT may receive an envelope payload that includes a plurality of user frames output from a PLID buffer. The plurality of user frames included in the envelope payload output from the PLID buffer may be multiplexed for each PLID and may be transmitted to the 25 G queue. The 25 queue may have a bus with a length of 64 bits (8 bytes) and a frame may be transmitted to the 25 G queue through the bus. Referring to a diagram 510 of FIG. 5, the plurality of user frames may be input to the 25 G queue and transmitted to the ONU with PLID=1 and the ONU with PLID=2. Here, "I" denotes idle. It can be known that the envelope payload including two user frames transmitted to the ONU with PLID=1 is transmitted to the 25 G queue.

Since the envelope payload including the plurality of user frames is stored only in the 25 G queue, a 2D alignment buffer 520 may store the envelope payload output from the 25 G queue in a zero-th column. Since the envelope frame is stored in the zero-th column of the 2D alignment buffer 520, the envelope frame may be transmitted to the ONU with PLID=1 and the ONU with PLID=2 through lane 0. Referring to a diagram 530, the envelope frame may be output through lane 0. Also, an envelope header to be additionally combined by the MPRS input process is generated only in response to a change in a destination of an envelope payload transmitted through each lane. Thus, it can be known that a single envelope header having a length of 8 bytes is combined with two frames transmitted to the ONU with PLID=1. Accordingly, when combining the envelope header, overhead may be reduced.

The 25 G queue may store the envelope payload through a 512-bit (64-byte) data bus per clock. Each lane may transmit an envelope payload to an ONU through a 128-bit (16-byte) data bus per clock. Accordingly, 512-bit data input to the 25 G queue may be transmitted to an ONU through a lane during a 4-clock cycle.

Figure 6:
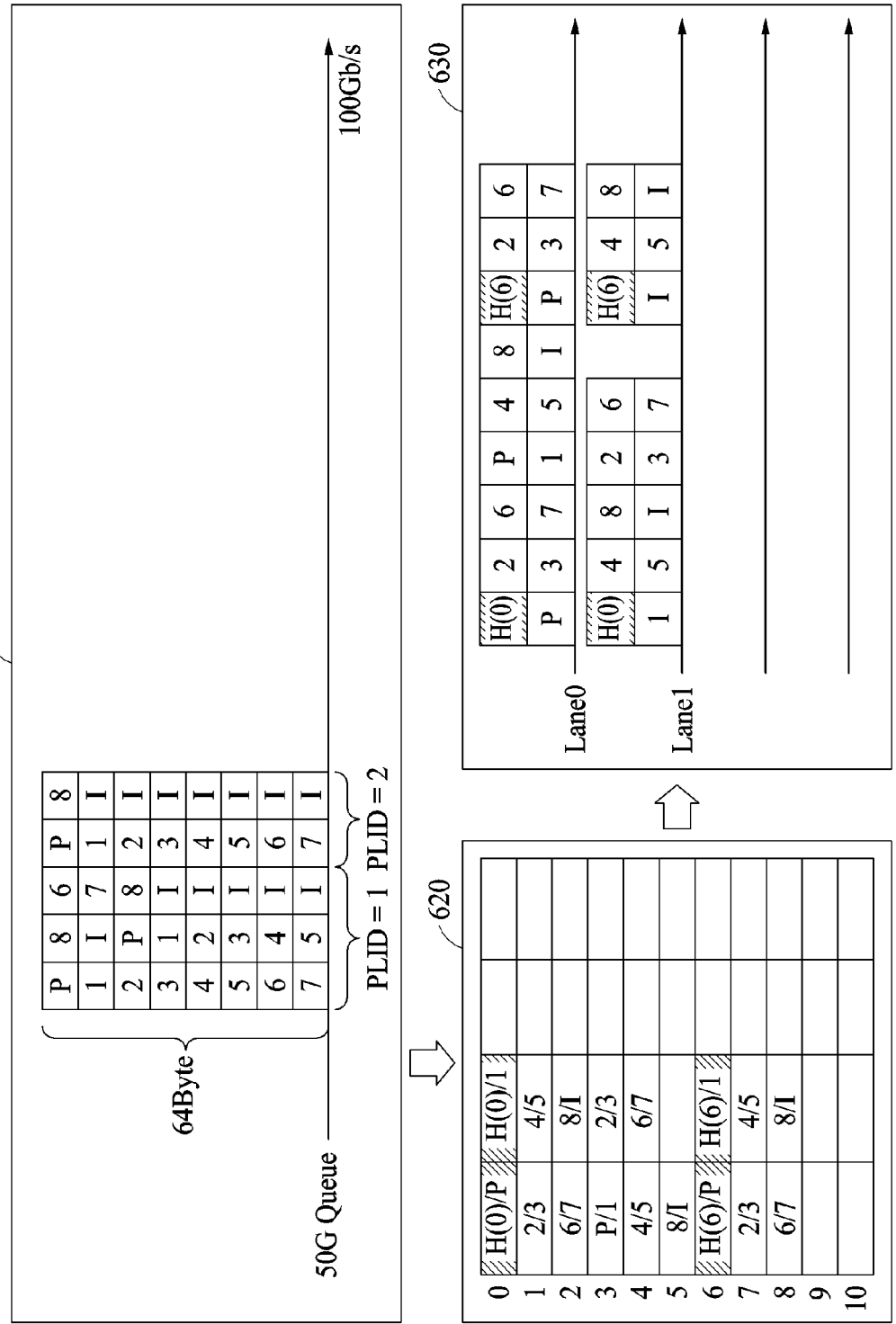
FIG. 6 illustrates an example in which an OLT transmits a user frame having a transmission rate of 50 Gb/s using channel bonding according to an example embodiment.

FIG. 6 illustrates an example in which an OLT transmits a user frame having a transmission rate of 50 Gb/s using channel bonding according to an example embodiment.

Referring to a diagram 610 of FIG. 6, a plurality of user frames may be transmitted to a 50 G queue of an MPRS input process of the OLT. Herein, it is assumed that the OLT transmits two user frames to an ONU with PLID=1 and transmits a single user frame to an ONU with PLID=2. Each user frame may include a preamble indicated with "P". The 50 G queue may receive, from a PLID buffer, an envelope payload that includes a plurality of user frames multiplexed for each PLID.

Since the envelope payload including the plurality of user frames is stored only in the 50 G queue, the envelope payload stored in the 50 G queue may be stored in a zero-th column and a first column of a 2D alignment buffer 620. Accordingly, the envelope payload including the plurality of user frames may be transmitted to the ONU through lane 0 and lane 1 corresponding to the zero-th column and the first column of the 2D alignment buffer 620, respectively. Referring to a diagram 630, the plurality of user frames may be transmitted to the ONU through lane 0 and lane 1.

Referring to the diagram 630, the envelope payload that includes two user frames transmitted to the ONU with PLID=1 may be stored in lane 0 and lane 1, and an 8-byte envelope header may be added to the envelope payload stored in each of lane 0 and lane 1 prior to transmitting the envelope payload. The envelope payload transmitted from the 50 G queue may be stored in the 2D alignment buffer 620. Data stored in the 2D alignment buffer 620 may be output through each lane in order in which the data is stored.

Figure 7:
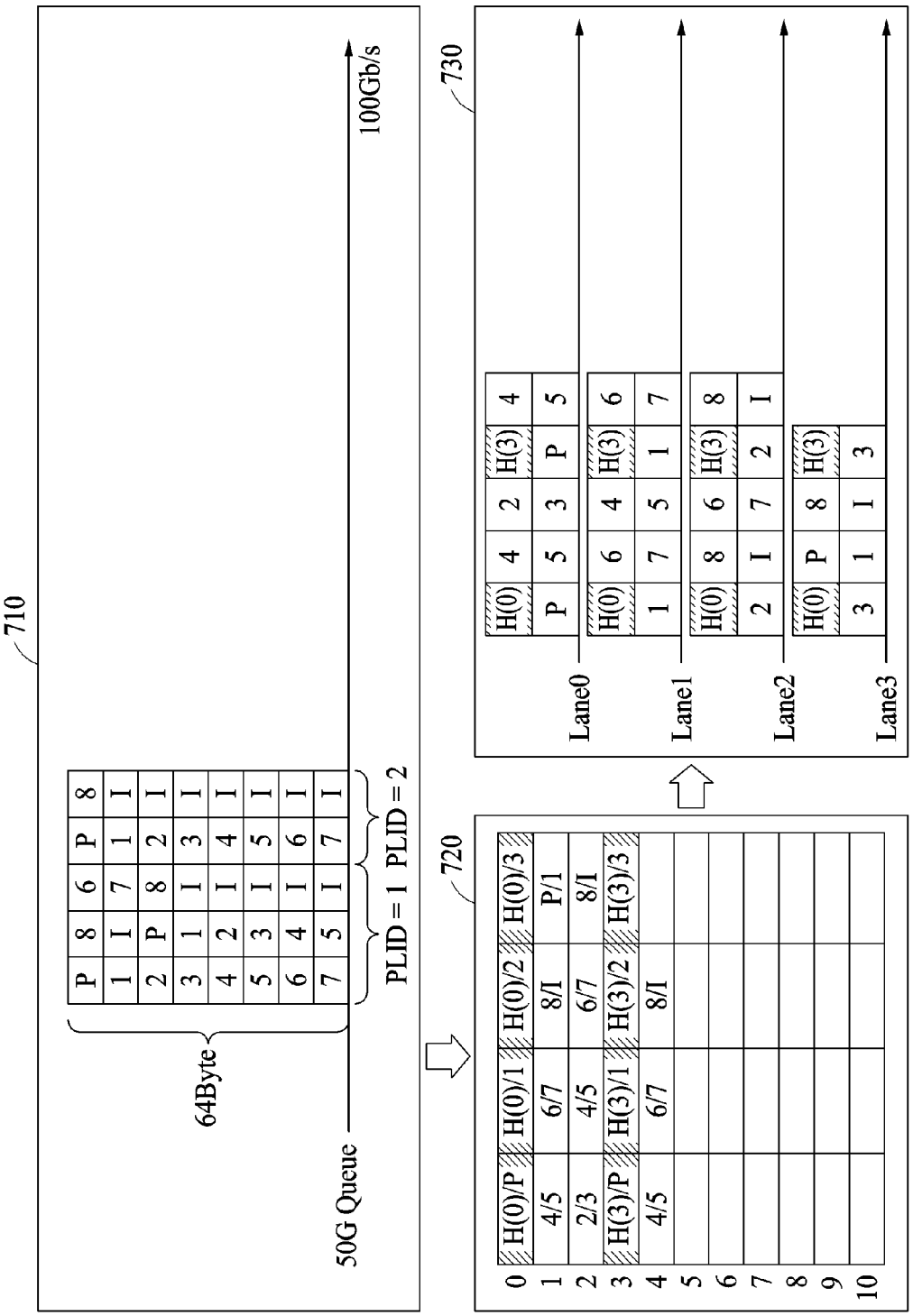
FIG. 7 illustrates an example in which an OLT transmits a user frame having a transmission rate of 100 Gb/s using channel bonding according to an example embodiment.

FIG. 7 illustrates an example in which an OLT transmits a user frame having a transmission rate of 100 Gb/s using channel bonding according to an example embodiment. Herein, it is assumed that the OLT transmits two user frames to an ONU with PLID=1 and transmits a single user frame to an ONU with PLID=2. Each user frame may include a preamble indicated with "P".

A 100 G queue of an MPRS input process of the OLT may receive an envelope payload that includes a plurality of user frames output from a PLID buffer and multiplexed for each PLID. Referring to a diagram 710 of FIG. 7, the plurality of user frames may be input to the 100 G queue and transmitted to the ONU with PLID=1 and the ONU with PLID=2.

Since the envelope payload including the plurality of user frames is stored in the 100 G queue, a 2D alignment buffer 720 may store the envelope payload output from the 100 G queue in all of zero-th to third columns. Accordingly, the envelope payload including the plurality of user frames may be transmitted to the ONU with PLID=1 and to the ONU with PLID=2 through all of lane 0 to lane 3. Referring to a diagram 730, a plurality of envelope frames may be output for the respective lanes of the OLT.

Referring to FIG. 7, an 8-byte envelope header may be added for each lane. The envelope payload output from the 100 G queue may be stored in order from a zero-th column to a third column and from a zero-th row to a fourth row of the 2D alignment buffer 720. The envelope frame stored in the 2D alignment buffer 720 may be output through each corresponding lane in order in which the envelope frame is stored.

Figure 8:
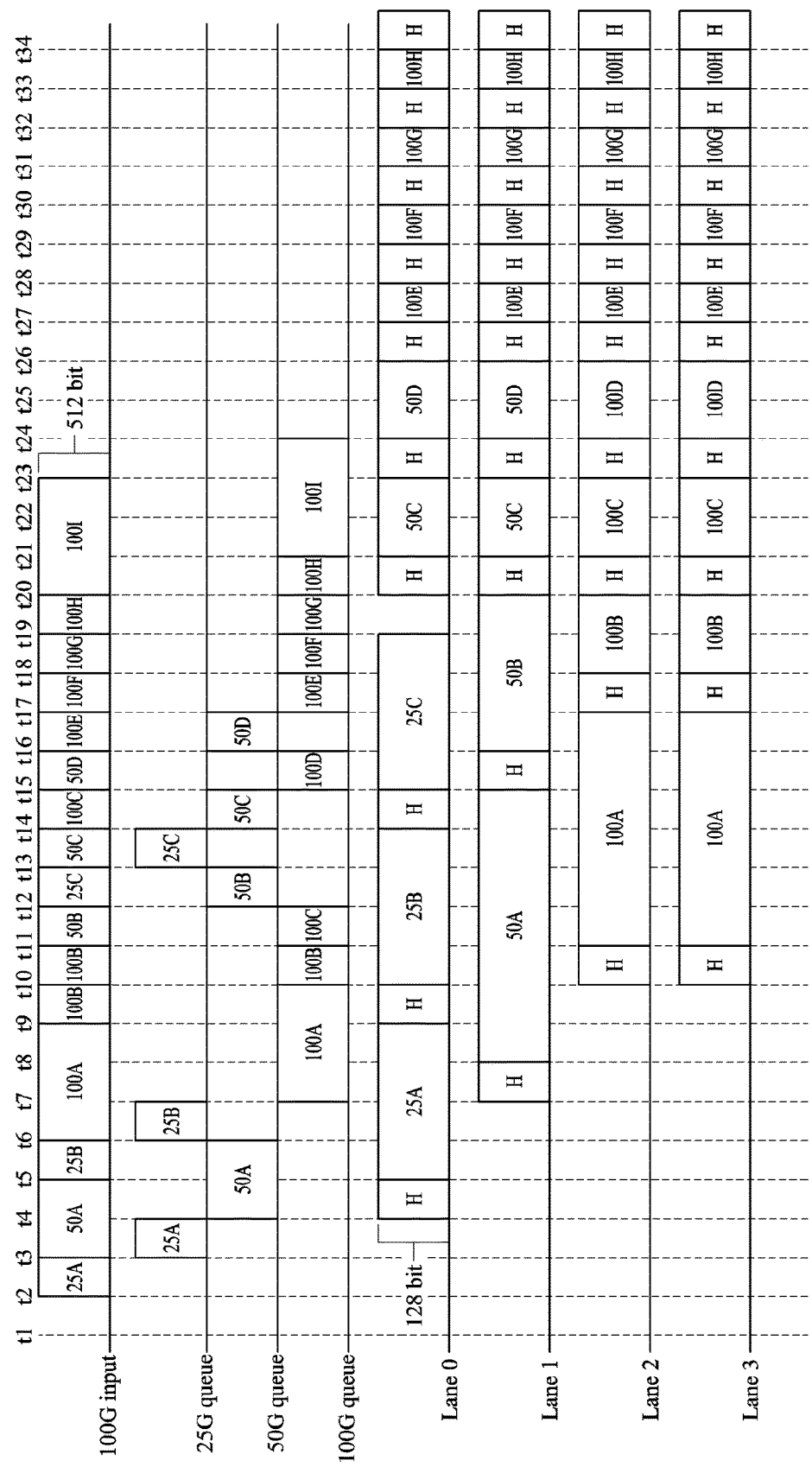
FIG. 8 illustrates an example in which an OLT performs downstream transmission and transmits user frames having different transmission rates to a plurality of lanes using channel bonding according to an example embodiment.

FIG. 8 illustrates an example in which an OLT performs downstream transmission and transmits user frames having different transmission rates to a plurality of lanes using channel bonding according to an example embodiment. Herein, it is assumed that each of a plurality of ONUs connected to the OLT supports a transmission rate of 25 Gb/s, 50 Gb/s, or 100 Gb/s.

Referring to a diagram 800 of FIG. 8, 100 G input axis denotes an envelope payload transferred to an MPRS input process of the OLT and having a transmission rate of 100 Gb/s. Envelope payloads transmitted to an ONU supporting the transmission rate of 25 Gb/s are illustrated as 25A, 25B, . . . , 25C in order in which the envelope payloads are transferred to the MPRS input process. Envelope payloads transmitted to an ONU supporting the transmission rate of 50 Gb/s are illustrated as 50A, 50B, . . . , 50D in order in which the envelope payloads are transferred to the MPRS input process. Envelope payloads transmitted to an ONU supporting the transmission rate of 100 Gb/s are illustrated as 100A, 100B, . . . , 100I in order in which the envelope payloads are transferred to the MPRS input process.

Referring to FIG. 8, a 25A envelope payload may be input to the 25 G queue of the MPRS input process in a time t4. The 25 G queue may transmit an envelope request signal to an envelope activation process in the time t4. Since lane 0 is not used in the time t4 and the envelope request signal is transmitted only from the 25 G queue, the envelope activation process may allocate Envelope to lane 0 in the time t4. Accordingly, the 25 G queue may transmit the 25A envelope payload and the envelope header to the corresponding ONU through lane 0. Herein, the terms "Envelope" and "envelope header" may be interchangeably used.

A 50A envelope payload may be input to the 50 G queue of the MPRS input process in a time t6. The 50 G queue may transmit an envelope request signal to the envelope activation process in the time t6. Since lane 0 is in use in the time t6, the envelope activation process may allocate Envelope to lane 1 between lane 0 and lane 1 that may be used by the ONU supporting the transmission rate of 50 Gb/s. Accordingly, the 50 G queue may transmit the 50A envelope payload and the envelope header to the corresponding ONU through lane 1.

A 25B envelope payload may be input to the 25 G queue of the MPRS input process in a time t7. The 25 G queue may transmit an envelope request signal to the envelope activation process in response to the input 25B envelope payload. Since lane 0 available to the ONU supporting the transmission rate of 25 Gb/s is in use in the time t7 (here, the 25A envelope payload is being transmitted through lane 0 in the time t7), the envelope activation process may not allocate an envelope. That is, a grant for any lane may not be allocated to the 25 G queue.

Referring to FIG. 8, transmission of the 25A envelope payload may be terminated in a time t9 and the 25 G queue may transmit an envelope request signal to the envelope activation process in the time t9. Since lane 9 is not in use in the time t9, the envelope activation process may allocate Envelope to lane 0. Accordingly, the 25 G queue may transmit the 25B envelope payload and the envelope header to the corresponding ONU through lane 0.

A 100A envelope payload may be input to the 100 G queue of the MPRS input process in a time t10. Immediately after the 100A envelope payload is input, the 100 G queue may transmit an envelope request signal to the envelope activation process. Since lane 0 and lane 1 are in use among lane 0 to lane 3 available to the ONU supporting the transmission rate of 100 Gb/s, the envelope activation process may allocate Envelope to lane 2 and lane 3. Accordingly, the 100 G queue may transmit the 100A envelope payload and the envelope header to the corresponding ONU through each of lane 2 and lane 3.

A 100B envelope payload may be input to the 100 G queue of the MPRS input process in a time t11. Since the 100 G queue is transmitting the 100A envelope payload in the time t11, the 100 G queue may not transmit an envelope request signal to the envelope activation process in the time t11. That is, if a frame is not being output from a queue generated for each transmission rate of the MPRS input process, the MPRS input process may transmit an envelope request signal to the envelope activation process. If an envelope payload is being output from a queue generated for each transmission rate of the MPRS input process, the MPRS input process may not transmit an envelope request signal to the envelope activation process.

A 100C envelope payload may be input to the 100 G queue of the MPRS input process in a time t12. Since the 100 G queue is transmitting the 100A envelope payload in the time t12, the 100 G queue may not transmit an envelope request signal to the envelope activation process in the time t12.

A 50B envelope payload may be transmitted to the 50 G queue of the MPRS input process in a time t13. Since the 50 G queue is transmitting the 50A envelope payload in the time t13, the 50 G queue may not transmit an envelope request signal to the envelope activation process in the time t13.

A 25C envelope payload may be input to the 25 G queue of the MPRS input process in a time t14. Since lane 0 is not in use in the time t14, the envelope activation process may allocate Envelope to lane 0. The 25 G queue may transmit the 25C envelope payload and the envelope header to the corresponding ONU through lane 0.

A 50C envelope payload may be input to the 50 G queue of the MPRS input process in a time t15. The 50 G queue may transmit an envelope request signal to the envelope activation process. Although the ONU supporting the transmission rate of 50 Gb/s is capable of using all of lane 0 and lane 1, lane 0 is in use in the time t15. Thus, the envelope activation process may allocate Envelope to lane 1 in the time t15. The 50 G queue may transmit the 50C envelope payload and the envelope header to the corresponding ONU through lane 1.

A 100D envelope payload may be input to the 100 G queue of the MPRS input process in a time t16. Since the 100 G queue is transmitting the 100A envelope payload in the time t16, the 100 G queue may not transmit an envelope request message for the 100D envelope payload to the envelope activation process. Since transmission of the 100A envelope payload is completed in a time t17, the 100 G queue may transmit an envelope request message for the 100D envelope payload to the envelope activation process in the time t17.

Since lane 0 and lane 1 are in use in the time t17, the envelope activation process may allocate Envelope to lane 2 and lane 3. The 100 G queue may transmit the 100D envelope payload and the envelope header to the corresponding ONU through lane 2 and lane 3 in the time t17.

A 100E envelope payload may be input to the 100 G queue of the MPRS input process in a time t18. Since the 100 G queue is transmitting the 100B envelope payload in the time t18, the 100 G queue may not transmit an envelope request message for the 100E envelope payload to the envelope activation process. Likewise, a 100F envelope payload may be input to the 100 G queue of the MPRS input process in a time t19. Since the 100 G queue is transmitting the 100B envelope payload in the time t19, the 100 G queue may not transmit an envelope request message for the 100F envelope payload to the envelope activation process.

The 50 G queue may complete transmission of the 50B envelope payload in a time t20. Once the transmission of the 50B envelope payload is completed, for example, in the time t20, the 50 G queue may transmit an envelope request message for the 50C envelope payload to the envelope activation process. Since lane 0 and lane 1 are not in use in the time t20, the envelope activation process may allocate Envelope to lane 0 and lane 1.

The 100 G queue may complete transmission of the 100B envelope payload in the time t20. In the time t20, the 100 G queue may transmit an envelope request message for the 100C envelope payload. Since lane 0 and lane 1 are in use to transmit the 50B envelope payload, the envelope activation process may allocate Envelope corresponding to the 100B envelope payload to lane 2 and lane 3. Accordingly, in the time t20, the 50C envelope payload may be transmitted to the corresponding ONU through lane 0 and lane 1, and the 100B envelope payload may be transmitted to the corresponding ONU through lane 2 and lane 3.

Transmission of the 50C envelope payload may be completed in a time t23. In the time t23, the 50 G queue may transmit an envelope request message for the 50D envelope payload. Also, since transmission of the 100C envelope payload is completed in the time t23, the 100 G queue may transmit an envelope request message for the 100D envelope payload. Since no lane is in use in the time t23, the envelope activation process may allocate lane 0 and lane 1 to the 50 G queue and allocate lane 2 and lane 3 to the 100 G queue. Accordingly, in the time t23, the 50 G queue may transmit the 50D envelope payload and the envelope header to the corresponding ONU through lane 0 and lane 1. Also, the 100 G queue may transmit the 100D envelope payload and the envelope header to the corresponding ONU through lane 2 and lane 3.

Transmission of the 100D envelope payload and the 50D envelope payload may be completed in a time t26. In the time t26, only the 100 G queue has an envelope payload, for example, 100E to 100I envelope payloads, to be transmitted. Accordingly, the 100 G queue may transmit an envelope request message for the 100E envelope payload to the envelope activation process in the time t26. Since no lane is in use in the time t26, the envelope activation process may allocate lane 0 to lane 3 to the 100 G queue. Accordingly, in the time t26, the 100 G queue may transmit the 100E envelope payload and an envelope header to be added for each lane to the corresponding ONU through lane 0 through lane 3. The 100F through the 100I envelope payloads may be sequentially transmitted to the corresponding ONU through the aforementioned operation.

Referring to FIG. 8, in an actual input, user frames having a length less than the envelope size may be multiplexed and thereby input to an envelope payload through the PLID buffer. A multilane-based OLT according to an example embodiment may determine a lane used to transmit the user frames having the short length based on a lane use state. Accordingly, the OLT may efficiently use a wavelength band of a PON. Further, the OLT may combine and transmit user frames for each ONU using the PLID buffer. Accordingly, an amount of envelope headers to be added by the MPRS input process may be reduced, alternatively, minimized. In addition, overhead occurring due to the addition of the envelope header may be reduced.

Figure 9:
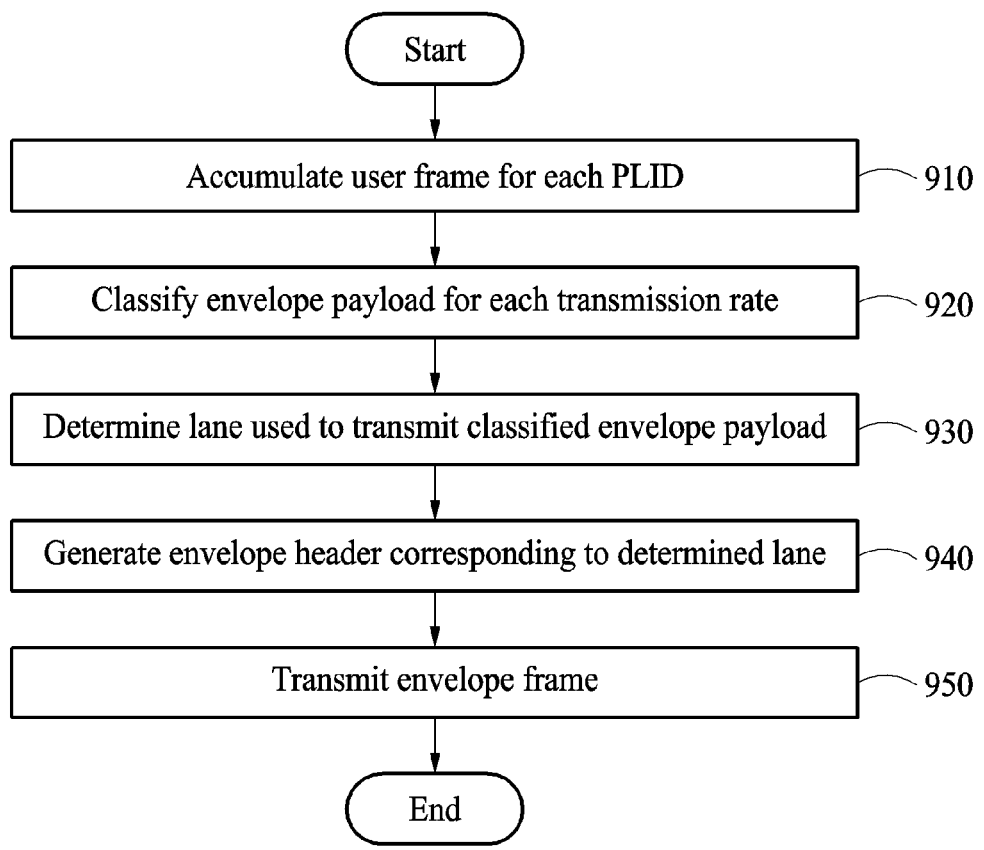
FIG. 9 is a flowchart illustrating an operation performed by an OLT according to an example embodiment.

FIG. 9 is a flowchart illustrating an operation performed by an OLT according to an example embodiment.

Referring to FIG. 9, in operation 910, the OLT may accumulate a user frame to be transmitted for each PLID. For example, the OLT may accumulate and store a frame in the PLID buffer 104 described with FIGS. 1 and 2. The PLID buffer 104 may include a user frame queue as a first queue. Here, the first queue may be identified based on a PLID of each of ONUs connected to the OLT and a number of first queues may be equal to a number of ONUS. The OLT may search a PLID table based on a destination address field value included in a user frame, and may identify a PLID of an ONU to receive the user frame. Similar to the description made with reference to FIG. 2, the OLT may identify the PLID of the ONU.

In operation 920, the OLT may classify the envelope payload for each transmission rate. The OLT may store the envelope payload in a second queue that is generated for each transmission rate, based on a classification result. A number of second queues may be equal to a number of transmission rates of ONUS connected to the OLT. The OLT may search an ONU type table based on a PLID of an ONU to receive a user frame and may determine a second queue in which the envelope payload is to be stored.

In operation 930, the OLT may determine a lane used to transmit the classified envelope payload based on a transmission rate of the ONU that receives the user frame and a use state of a lane that connects the OLT and the ONU. The lane used to transmit the classified envelope payload may be determined as a lane through which no second queue is outputting an envelope payload among lanes used by the ONU that receives the envelope payload. For example, of an ONU that receives a frame uses a plurality of lanes, and if a plurality of lanes is not in use among the plurality of lanes, the plurality of lanes not in use may be determined as the lanes used to transmit the classified envelope payload. In this case, the classified envelope payload may be transmitted through the determined plurality of lanes, for example, using channel bonding.

In operation 940, the OLT may generate an envelope header corresponding to the determined lane. Since a user frame to be transmitted through downstream transmission is accumulated for each PLID, the downstream transmission from the OLT to the ONU may be performed based on an accumulated frame unit, for example, envelope payload. That is, an envelope header may be generated for each envelope payload. Accordingly, in the case of dividing and thereby transmitting a plurality of user frames having a short length to the same ONU, an envelope payload including the plurality of user frames may be transmitted. That is, since there is no need to generate an envelope header for each user frame, overhead occurring due to generation of the envelope header may be reduced.

In operation 950, the OLT may transmit, to a corresponding ONU, the envelope frame in which the generated envelope header and the classified envelope payload are combined. In detail, prior to transmitting the classified envelope payload through the determined lane, the envelope header may be transmitted to the ONU corresponding to the classified envelope payload through the determined lane.

The components described in the example embodiments may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the example embodiments may be achieved by software, and the software may be recorded on a recording medium. The components, the functions, and the processes described in the example embodiments may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of transmitting, by an optical line terminal (OLT) including a first queue and a second queue, a user frame, the method comprising:
   storing the user frame in the first queue of the OLT, the first queue corresponding to an optical network unit (ONU) that receives the user frame;
   transmitting the user frame stored in the first queue to the second queue of the OLT;
   storing the transmitted user frame in the second queue of the OLT, the second queue corresponding to a transmission rate supported by the ONU; and
   outputting an envelope payload stored in the second queue to a lane that connects the OLT and the ONU, according to whether the lane is in use,
   wherein the storing of the user frame in the first queue comprises:
   generating a hash value from a destination address included in the user frame;
   searching a table that stores a physical layer identifier (PLID) of the ONU based on the hash value, and acquiring the PLID of the ONU; and
   storing the user frame in the first queue corresponding to the acquired PLID.

2. The method of claim 1, wherein the table is generated by adding the PLID of the ONU and a source address at a location of the table corresponding to a hash value that is generated from the source address indicated in a user frame received from the ONU, in response to the user frame being received from the ONU.

3. The method of claim 1, wherein the storing of the user frame in the second queue comprises storing an envelope payload stored in the first queue in the second queue using a table in which the ONU and the transmission rate supported by the ONU match.

4. The method of claim 1, wherein the outputting comprises:
   identifying a plurality of lanes corresponding to the transmission rate; and
   determining a lane to which the envelope payload stored in the second queue is output as a lane that does not transmit any frame among the plurality of lanes.

5. The method of claim 1, wherein the outputting comprises:
   generating an envelope header corresponding to the envelope payload stored in the second queue based on a lane to which the envelope payload stored in the second queue is output; and
   combining the envelope payload stored in the second queue with the generated envelope header.

6. The method of claim 1, wherein the storing of the user frame in the second queue comprises determining whether to store the user frame stored in the first queue in the second queue, based on a timer of the user frame stored in the first queue or an envelope payload size of the first queue.

7. An optical line terminal (OLT) comprising:
   a physical layer identifier (PLID) buffer configured to accumulate and store a user frame to be transmitted to one of a plurality of optical network units (ONUs) connected to the OLT, the user frame being accumulated and stored based on each PLID of the ONUs; and
   a frame transmitter configured to transmit an envelope payload to at least one of a plurality of lanes that connect the OLT and the plurality of ONUs, the envelope payload being generated from the accumulation of the user frame in the PLID buffer,
   wherein the frame transmitter comprises a plurality of transmission rate queues generated for transmission rates supported by the plurality of ONUs, respectively, and configured to store the envelope payload accumulated by the PLID buffer, and
   wherein the frame transmitter is configured to identify a lane that is used by an ONU corresponding to the envelope payload, and to output envelope payloads stored in the plurality of transmission rate queues to the identified lane based on whether the identified lane is in use.

8. The OLT of claim 7, wherein the PLID buffer comprises a plurality of frame queues generated for the plurality of ONUs, respectively, and configured to receive the user frame in order in which the user frame is received.

* * * * *